US006745318B1

(12) United States Patent
Mansingh et al.

(10) Patent No.: US 6,745,318 B1
(45) Date of Patent: Jun. 1, 2004

(54) METHOD AND APPARATUS OF CONFIGURABLE PROCESSING

(76) Inventors: Sanjay Mansingh, 444 Saratoga Ave. apt 5d, Santa Clara, CA (US) 95050; Niteen Patkar, 1063 Morse Ave. apt 7103, Sunnyvale, CA (US) 94089; Korbin Van Dyke, 3343 Little Valley Rd., Sunol, CA (US) 94586; Stephen Hale, 5673 Mineille Dr., San Jose, CA (US) 95118; Dee Tovey, 14165 Old Japanese Rd., Los Gatos, CA (US) 95033; Nital Patwa, 716 Ashton Oaks Way, San Jose, CA (US) 95138; Stephen C. Purcell, 365 Preston Dr., Mountain View, CA (US) 94040

( * ) Notice: Subject to any disclaimer, the term of this patent is extended or adjusted under 35 U.S.C. 154(b) by 0 days.

(21) Appl. No.: 09/376,830

(22) Filed: Aug. 18, 1999

(51) Int. Cl.⁷ .............................................. G06F 17/10
(52) U.S. Cl. .......................................... 712/23; 712/32
(58) Field of Search ..................................... 712/23, 32

(56) References Cited

U.S. PATENT DOCUMENTS

| 4,617,625 | A | * | 10/1986 | Nagashima et al. | ............ 712/4 |
|---|---|---|---|---|---|
| 4,761,755 | A | * | 8/1988 | Ardini et al. | ................ 708/518 |
| 4,866,652 | A | * | 9/1989 | Chu et al. | .................... 708/501 |
| 4,916,651 | A | * | 4/1990 | Gill et al. | .................... 708/507 |
| 6,151,682 | A | * | 11/2000 | van der Wal et al. | ........ 327/149 |
| 6,209,078 | B1 | * | 3/2001 | Chiang et al. | ............... 345/505 |
| 6,223,198 | B1 | * | 4/2001 | Oberman et al. | ........... 708/620 |
| 6,226,735 | B1 | * | 5/2001 | Mirsky | ........................ 708/209 |
| 6,249,856 | B1 | * | 6/2001 | Garg et al. | .................... 712/23 |
| 6,266,760 | B1 | * | 7/2001 | DeHon et al. | ................. 712/11 |

\* cited by examiner

Primary Examiner—Eric Coleman
(74) Attorney, Agent, or Firm—Vedder Price Kaufman & Kammholz

(57) ABSTRACT

An apparatus that provides configurable processing includes a fetch module, a decoder, and a dynamic arithmetic unit. The fetch module is operable to fetch at least one instruction and provide it to the decoder. The decoder receives the instruction and decodes it. The dynamic arithmetic logic unit receives the decoded instruction and configures at least one configurable arithmetic logic unit to perform an operation contained within the decoded instruction.

7 Claims, 5 Drawing Sheets

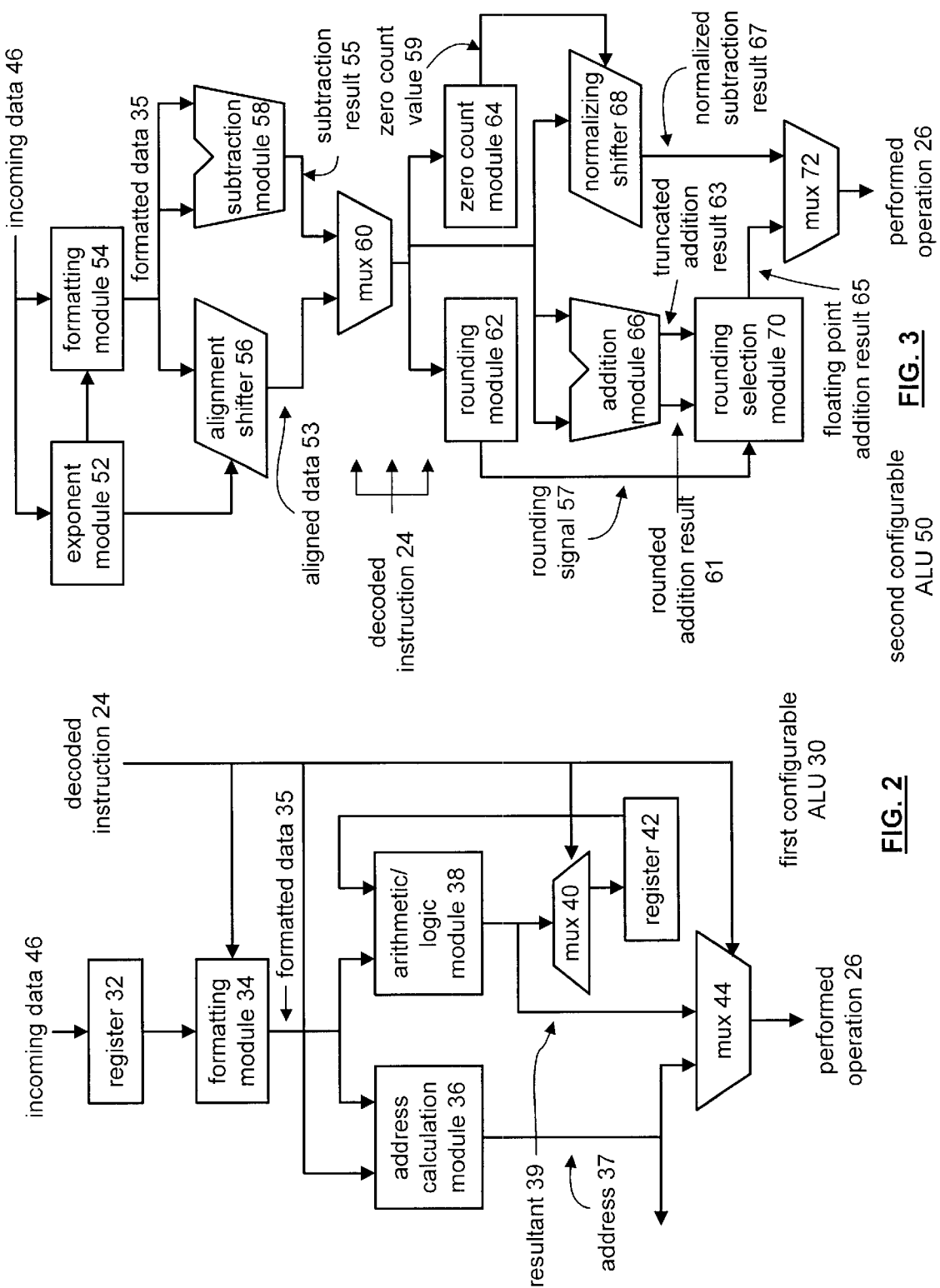

METHOD AND APPARATUS OF CONFIGURABLE PROCESSING

TECHNICAL FIELD OF THE INVENTION

This invention relates generally to central processing unit architectures and more particularly to a configurable processor.

BACKGROUND OF THE INVENTION

The architecture of a central processing unit is known to include an instruction cache, a fetch module, an instruction decoder, an instruction issuance module, an arithmetic logic unit (ALU), a load/store module, and a data cache. The instruction cache and data cache are used to temporarily store instructions and data, respectively. Once an instruction is cached, the fetch module retrieves it and provides it to the decoder. Alternatively, the fetch module may retrieve an instruction directly from main memory and provide it to the decoder, and may further store the instruction in the instruction cache. The decoder decodes the instruction into microcode and, via the instruction issuance module, provides it to the ALU. The ALU performs a plurality of operations and includes an address calculation module, a plurality of integer operation modules, a plurality of floating point modules, and a plurality of multi-media operation modules. The integer modules may include two arithmetic/logic modules, shift modules, one multiply module, and one divide module. The floating point modules include a floating point adder and a floating point multiplier. The multi-media modules include two multimedia arithmetic and logic modules, one multi-media shift module and one multi-media multiplier. Note that an arithmetic function is an addition operation or a subtraction operation. Further note that a logic function is a AND, NAND, compare, OR, NOR, or XOR operation. Further note that the multi-media modules are configurable to process packed data having 8 bit, 16 bit, 32 bit or 64 bit data elements.

When the ALU receives an instruction (some processors allow two or three instructions to be processed simultaneously) it provides the instruction to the appropriate module based on the operation to be performed. For example, a load-store operation will be processed by the address calculation module, such that the correct data is stored and/or loaded into the data cache, or into main memory.

When such a CPU is fabricated as an integrated circuit, it requires a large die area, yielding a large integrated circuit. As is generally known, the smaller the die, the less expensive the resulting integrated circuit will typically be. Therefore, a need exists for a central processing unit that has a relatively small integrated circuit footprint to contain costs.

BRIEF DESCRIPTION OF THE DRAWINGS

FIG. 2 illustrates a schematic block diagram of a configurable arithmetic logic unit (ALU) module in accordance with the present invention;

FIG. 3 illustrates a schematic block diagram of another configurable ALU module in accordance with the present invention.

DETAILED DESCRIPTION OF A PREFERRED EMBODIMENT

Generally, the present invention provides a method and apparatus for configurable processing. A configurable processing unit includes a fetch module, a decoder, and a dynamic arithmetic unit. The fetch module is operable to fetch at least one instruction and provide it to the decoder. The decoder receives the instruction and decodes it. The dynamic arithmetic logic unit receives the decoded instruction and configures at least one configurable arithmetic logic unit to perform an operation contained within the decoded instruction. With such a method and apparatus, a processing unit may be fabricated using considerably less components than in previous processing units thereby reducing the die size and the associated costs. Further, by reducing the die size, the configurable processing unit may be included within an integrated computing system.

Figure 1:
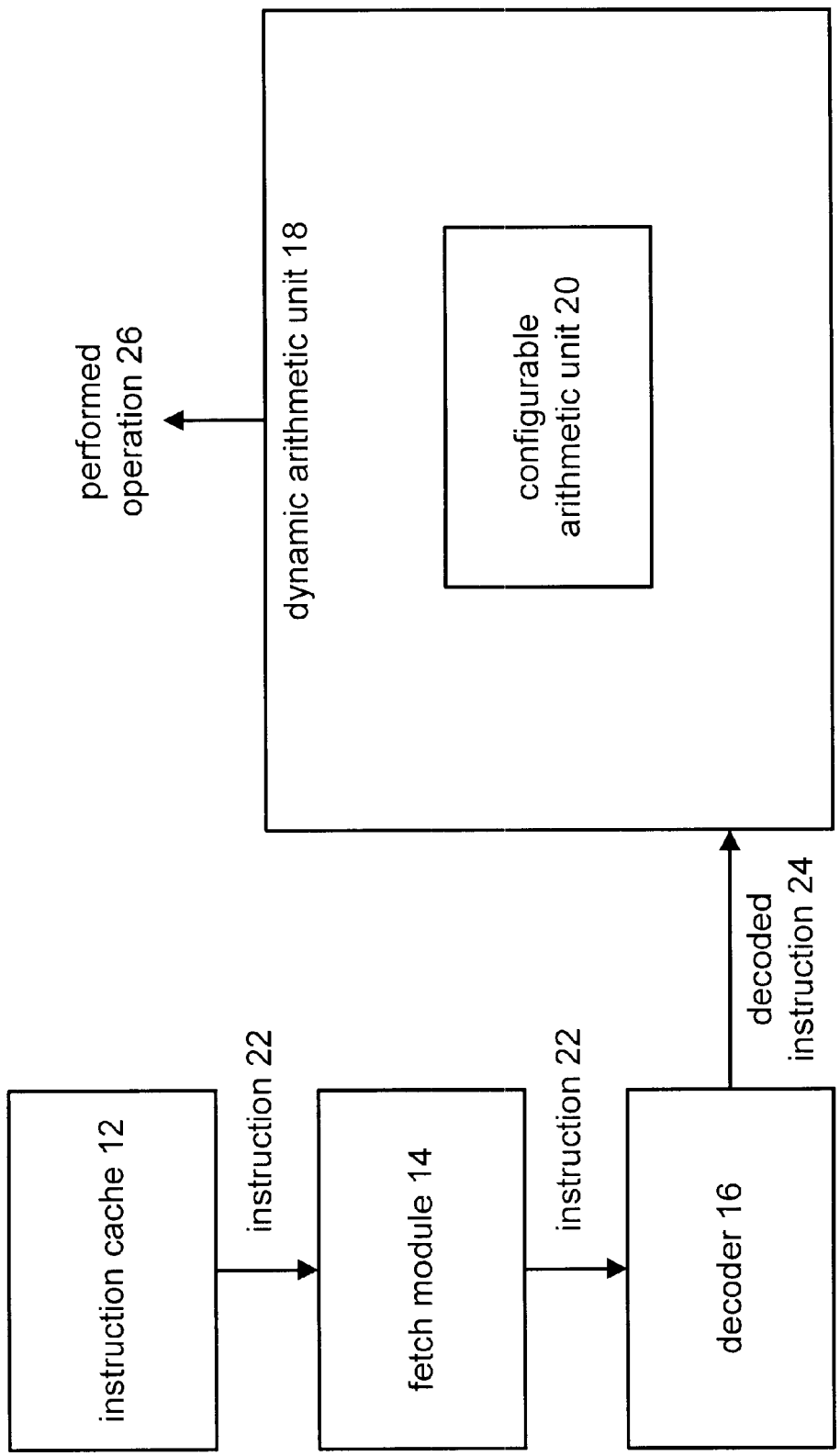
FIG. 1 illustrates a schematic block diagram of a processing unit in accordance with the present invention.

The present invention can be more fully described with reference to FIGS. 1 through 6. FIG. 1 illustrates a schematic block diagram of a configurable processor 10 that includes an instruction cache 12, a fetch module 14, a decoder 16, and a dynamic arithmetic unit 18. The instruction cache 12, fetch module 14, and decoder 16, which may further include instruction issuance functionality, may be of conventional design. As such, the instruction cache 12 stores instructions 22 which are fetched, via the fetch module 14, and provided to the decoder 16. The decoder decodes the instruction to produce a decoded instruction 24. The decoded instruction may be in accordance with x86 microcode instructions.

The dynamic arithmetic unit 18 includes at least one configurable arithmetic unit 20. Upon receiving the decoded instruction 24, the configurable arithmetic unit 20 is configured to perform the appropriate operation indicated in the decoded instruction 24. Once configured, the configurable arithmetic unit 20 performs the operation to produce a performed operation 26. The dynamic arithmetic unit 18 may include a plurality of configurable arithmetic units similar to those shown in FIGS. 2, 3 and 4, or may contain a single arithmetic logic unit as shown in FIG. 5.

FIG. 2 illustrates a schematic block diagram of a first configurable arithmetic logic unit 30. The first configurable arithmetic logic unit 30 is configurable to perform an address calculation, an integer addition, an integer subtraction, an integer logic function (e.g., and, or, exclusive, compare, etc.) a packed integer addition, a packed integer subtraction and/or a packed integer logic function. To achieve these functions, the first configurable ALU 30 includes at least one register 32, a formatting module 34, an address calculation module 36, an arithmetic/logic module 38, a multiplexor 40, register 42, and multiplexor 44.

The register 32 is operably coupled to receive incoming data 46, which is provided to the formatting module 34. Based on the decoded instruction 24, the formatting module 34 produces formatted data 35. The formatted data 35 will be in accordance with the type of operation being performed. For example, if an integer function is being performed, the formatted data will be integer form. In furtherance of the example, if the data cache line is 64 bits and the integer value is 16 bits, the formatted data will have the integer values in the least significant 16 bits with the remaining bits being don't care bits. Conversely, when the decoded instruction is for a packed operation (i.e., a multi-media function), the formatted data 35 will include the packed data. The packed data may include a plurality of 8 bit data elements, 16 bit data elements, 32 bit data elements, or 64 bit data elements. The number of data elements in a formatted data 35 will depend on the bandwidth, or data cache line, of the system and the size of the data elements. For example, a 256 bit cache line will accommodate four 64 bit packed data elements. As a further example, when an address function is to be processed, the incoming addressing data 46 may or may not be formatted depending on instructions in the decoded instruction 24.

The address calculation module 36 is operably coupled to receive the formatted data 35 and the decoded instruction 24. If the decoded instruction 24 is for a load/store operation and/or an address calculation, the address calculation module 36 will be enabled. Once enabled, the address calculation module 36 will process the formatted data 35 to produce an address 37. Such an address calculation is known. The address 37 will be provided as an output or to multiplexor 44 which will select address 37 based on the decoded instruction 24 to produce the performed operation 26. If the decoded instruction is an arithmetic function or logic function, the arithmetic logic module 38 will be enabled. Once enabled, the arithmetic/logic module 38 will perform the corresponding arithmetic function or logic function upon the formatted data 35, which will be provided to multiplexor 40 and/or multiplexor 44. The multiplexor 40, based on the decoded instruction 24, may output the arithmetic/logic result 39 to register 42 as intermediate data. If the result is provided to register 42, the arithmetic logic module 38 performs another arithmetic and/or logic function upon the data to produce a final result as the performed operation 26.

As configured, the address calculation, the integer arithmetic/logic function, and multimedia arithmetic/logic function may be performed in a first pipeline interval. As such, it takes one pipeline interval for the first configurable arithmetic logic unit 30 to produce the performed operation 26 from the incoming data 46. If the operation is a load/store function, the corresponding data will be cached in a second pipeline interval. Note that the arithmetic/logic module 38 includes logic circuitry to perform the corresponding logic functions and further includes an addition module to perform the addition and/or subtraction function. Further note that the arithmetic/logic unit 38, based on the decoded instruction 24 configures itself to process integer data or packed integer data. As such, if 64 bit data is capable of being processed, the arithmetic/logic module 38 would include eight 8 bit arithmetic/logic functional modules. The 8 function modules may be configured to perform separate operations, as would be the case for processing 8 bit packed data elements, or linked to provide carryover bits to process 64 bit data. As one of average skill in the art will appreciate, any one of the modules of FIG. 2 could be configured to directly receive the incoming data 46 and to directly produce the performed operation 26.

FIG. 3 illustrates a schematic block diagram of a second configurable ALU 50. The second configurable ALU 50 can be configured to perform a floating point addition, a floating point subtraction, a second integer addition, an integer subtraction, an integer logic function, a packed integer addition, a packed integer subtraction, a packed integer logic function, an integer division, an integer shift, and/or a packed integer shift. The second configurable ALU 50 includes an exponent module 52, a formatting module 54, an alignment shifter 56, a subtraction module 58, a multiplexor 60, a rounding module 62, a zero count module 64, an addition module 66, a normalizing shifter 68, a rounding selection module 70, and a multiplexor 72.

The formatting module 54 receives the incoming data 46 to produce formatted data 35 based on an exponent indication received by the exponent module 52. The exponent module 52 receives the incoming data 46 and produces the exponent indication. In essence, the formatting module 54 produces, using conventional techniques, the formatting data 35 to be integer data, floating point data, packed integer data, or packed floating point data based, at least in part, on the exponent value of the incoming data. To perform a floating point addition, and floating point subtractions where the exponent difference between the incoming sources exceeds one, via the second configurable ALU, the alignment shifter 56, the rounding module 62, the addition module 66, and the rounding selection module 70 are enabled via the decoded instruction 24. As such, the alignment shifter 56 shifts the formatted data 35 based on the exponent indication received by the exponent module 52. Such alignment is known in the art. Multiplexor 60 selects, based on the decoded instruction 24, the aligned data 53 and provides it to the rounding module 62. Note that the generation of the alignment data 53 is performed in a first stage of a pipelined process.

The rounding module 62 determines whether the floating point addition result 65 is to be rounded up in magnitude or not. Such a determination is made based on the decoded instruction 24 and the result. The rounding module 62 produces a corresponding rounding signal 57. The production of the rounding signal 57 is performed in a second stage of the pipeline process.

During a third stage of the pipeline process, the addition module 66 receives the aligned data 53 from multiplexor 60 and produces two results. The first being a rounded addition result 61, the second being an addition result 63, which is a truncated version of the result. Both the rounded addition result 61 and addition result 63 are provided to the rounding selection module 70. Based on the rounding signal 57, the rounding selection module 70 selects one of the signals 61 or 63 to produce the floating point addition result 65. The multiplexor 72 selects, based on the decoded instruction, the floating point addition result 65 as the performed operation 26.

To perform a floating point subtraction where the exponent difference between the incoming sources is equal to or less than one, subtraction module 58, zero count module 64, and normalizing shifter 68 are enabled via the decoded instruction 24. The subtraction module 58 receives the formatted data 35 and produces therefrom a subtraction result 55. The subtraction result 55 is selected by multiplexor 60 based on the decoded instructions 24. Note that the production of the subtraction result 55 is done in a first stage of a pipeline process.

During a second stage of the pipeline process, the zero count module 64 receives the subtraction result 55 and produces a zero count value 59 therefrom. As is known, the zero count module 64 determines the number of zeros in the subtraction result 55 proceeding the first one (for binary values).

During a third stage of the pipeline process, the normalizing shifter 68 receives the subtraction result 55 and shifts it based on the zero count value 59. This produces a normalized subtraction result 67, which is selected by multiplexor 72 as the performed operation 26.

The second configurable arithmetic logic unit 50 may include a plurality of registers (not shown) such that data may be inputted in various locations within the ALU 50. For example, to perform an integer addition operation, the formatted data 35 could be directly routed to, or the operands could be directly routed to, the addition module 66 without aligning. As such, an integer addition operation may be performed in a single pipeline stage. Similarly, an integer subtraction could be processed within a single pipeline stage by either the subtraction module 58 or the addition module 66. To perform a shift right operation, data can be directly provided to the alignment shifter 56 to produce a shifted result. The shifted result is then directly provided to multiplexor 72, which selects it as the performed operation 26. Similarly, the normalizing shifter 68, which typically performs a shift left operation, can receive the formatted data 35, or the incoming data 46, and produce shifted data as the performed operation 26. Also, the shifter 68 may perform a shift right operation on the data to produce the performed operation 26. As such, by interpreting the decoded instructions, and providing the formatted data to the appropriate elements within ALU 50, the configurable ALU 50 can perform a plurality of operations with minimal amount of circuitry. As one of average skill in the art will appreciate, any one of the modules of FIG. 3 could be configured to directly receive the incoming data 46 and to directly produce the performed operation 26.

Figure 4:
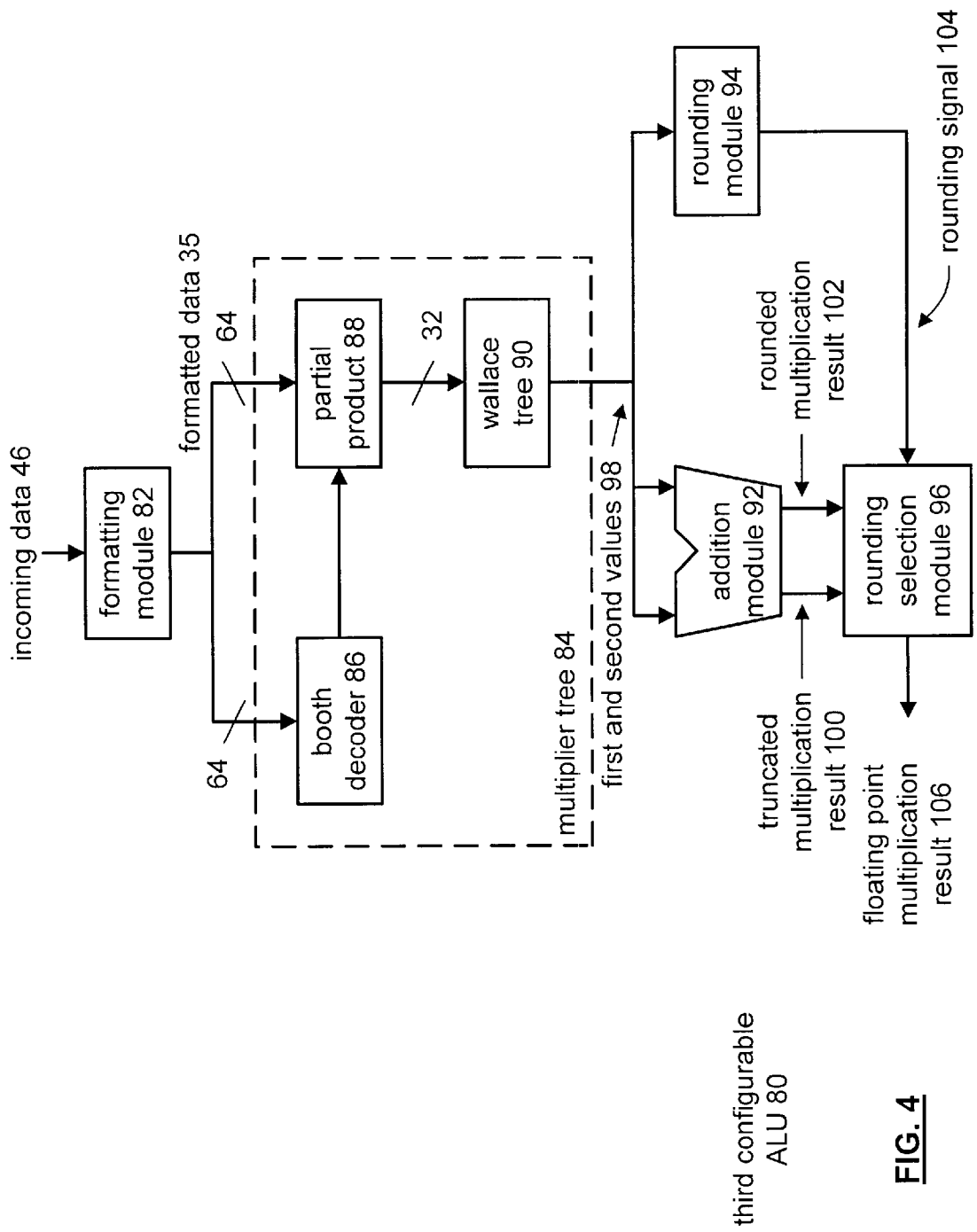
FIG. 4 illustrates yet another configurable ALU module in accordance with the present invention.
Figure 5:
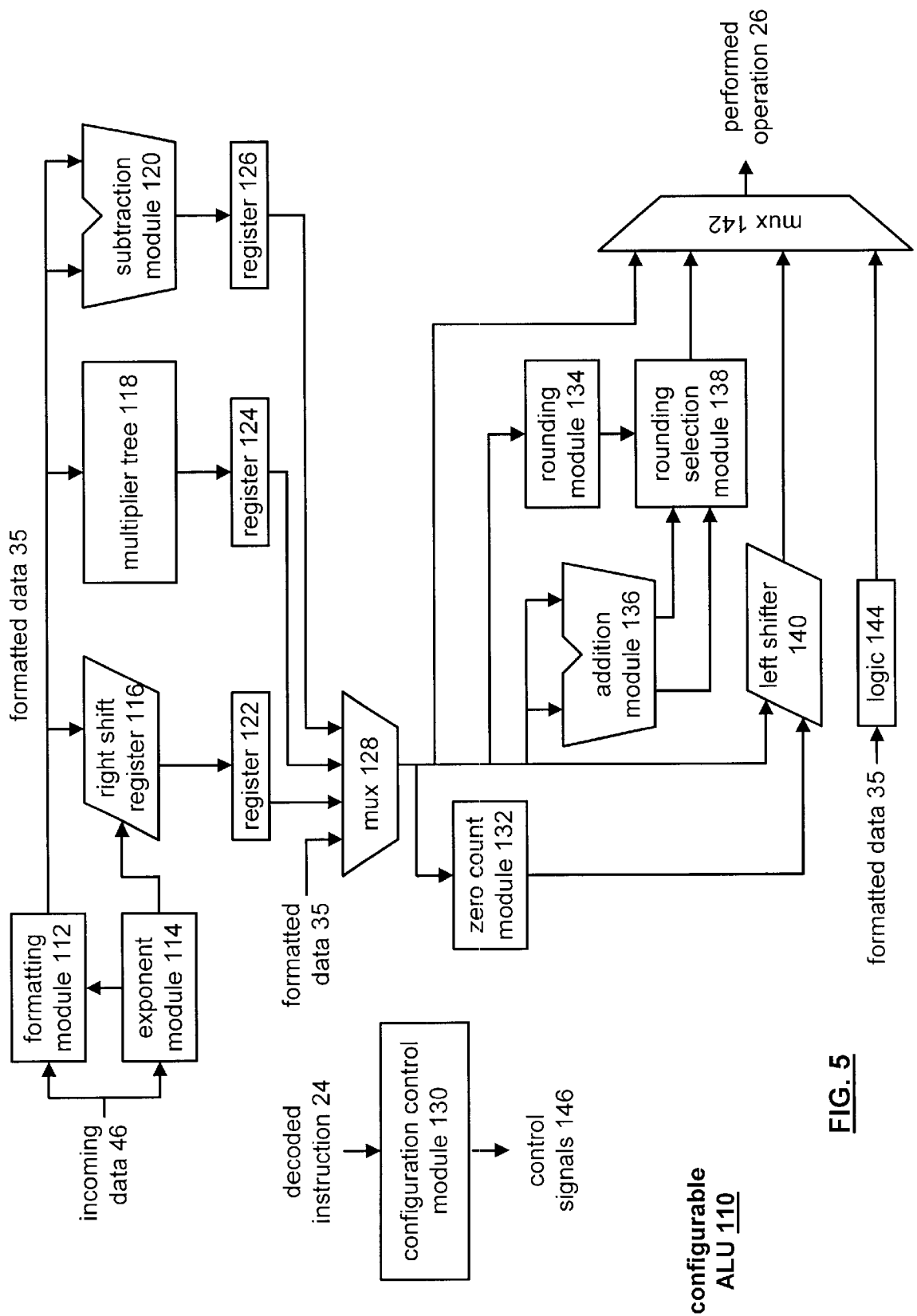
FIG. 5 illustrates a schematic block diagram of a configurable ALU module in accordance with the present invention.

FIG. 4 illustrates a schematic block diagram of a third configurable ALU 80. The third configurable ALU 80 is capable of performing a floating point multiplication, an integer multiplication, a packed integer multiplication, an integer addition, an integer subtraction, an integer logic function, a packed integer addition, a packed integer subtraction and/or a packed logic function. As shown, the third ALU 80 includes a formatting module 82, a multiplier tree 84, an addition module 92, a rounding module 94, and a rounding selection module 96. The multiplier tree 84 includes a booth decoder 86, a partial product module 88, and a Wallace tree module 90. The multiplier tree 84 receives formatted data 35 via the booth decoder 86 and the partial product module 88. The booth decoder 86, as is known, provides decodes the formatted data 35 and provides the decoded data to the partial product module 88. The partial product module 88 processes, as is known, the decoded data and the formatted data to produce a partial product result. The Wallace tree module 90 receives the partial product result to produce first and second values 98 in a known manner. This is done in a first pipeline stage of a floating point pipelined operation.

The rounding module 94, during a second stage of the pipeline operation, receives the first and second data values 98 and determines a rounding signal 104. In essence, the rounding module 94 performs a similar function as the rounding module 62 of FIG. 3.

During the third stage of the pipeline floating point multiplication operation, the addition module 92 adds the first and second values 98 together. The addition module 92 produces a truncated multiplication result 100 and a rounded multiplication result 102. The rounding selection module 96, based on the rounding signal 104 selects result 100 or result 102 as the floating point multiplication result 106.

For the third configurable ALU 80 to perform the other functions mentioned, additional registers may be incorporated. Accordingly, by providing data directly to the addition module 92, integer addition and subtraction may be performed. Similarly, the addition module 92, could be configured to perform packed addition and/or subtraction. To perform packed integer logic functions or integer logic functions, the third configurable ALU would include an arithmetic/logic unit similar to the unit 38 of FIG. 2.

FIG. 5 illustrates a schematic block diagram of a configurable ALU 110 that is capable of performing all, or a portion, of the functions of the first configurable ALU 30, the second configurable ALU 50, and the third configurable ALU 80. In essence, the configurable ALU 110 of FIG. 5 is a combination of the first, second, and third configurable ALUs wherein like components are shared.

As shown, the configurable ALU 110 includes a formatting module 112, an exponent module 114, a right-shift register 116, a multiplier tree 118, a subtraction module 120, a plurality of registers 122, 124, and 126, a multiplexor 128, a configuration control module 130, a zero count module 132, an addition module 136, a rounding module 134, a rounding selection module 138, a left-shifter 140, a multiplexor 142, and a logic module 144. The configuration control module 130 is operably coupled to receive the decoded instruction 24 and to produce a plurality of control signals 146. The control signals enable the appropriate modules such that the configurable ALU 110 can perform floating point additions, floating point subtractions, floating point multiplications, integer additions, integer subtractions, integer multiplications, integer logic functions, and/or packed integer additions, subtractions, multiplications, and logic functions.

For a floating point multiplication, multiplier tree 118 would be enabled, the multiplexor 128 would select the data stored in register 24 and provide it to the addition module 136 and the rounding module 134. The rounding selection module 138 would select the floating point result, which is outputted by multiplexor 132. To perform an integer addition, the control signals 146 would enable the addition module 136 to receive the formatted data 35 via multiplexor 128. The addition module would perform its function to produce the addition result. To perform an integer subtraction, the subtraction module 120 would produce a subtraction result which is stored in register 126. multiplexor 128, based on control signals, would retrieve the subtraction result from register 126 and provide it directly to multiplexor 142, which outputs the subtraction result as the performed operation 126.

As one of average skill in the art would appreciate, the configurable ALU 110 can perform a plurality of integer, multimedia and floating point operations with a minimal amount of circuitry. By utilizing a minimal amount of circuitry, the integrated real estate required to fabricate an arithmetic logic unit within a processor is minimized. As such, the processing unit of the present invention may be incorporated in an integrated computing system that can be economically produced.

Figure 6:
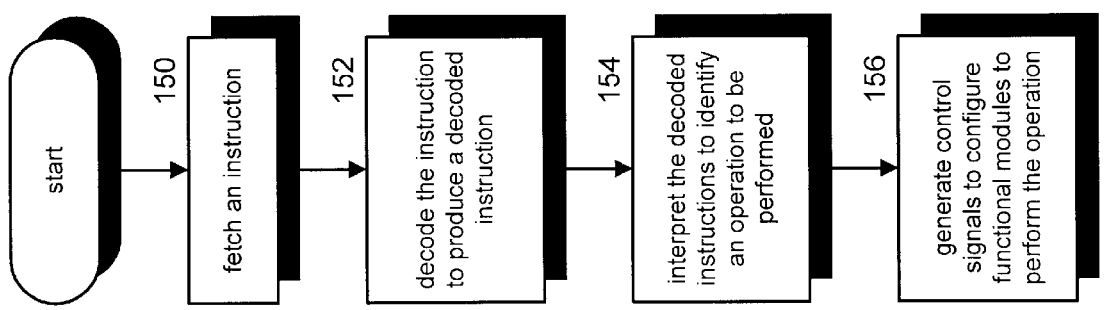
FIG. 6 illustrates a logic diagram of a method for configurable processing in accordance with the present invention.

FIG. 6 illustrates a logic diagram for configurable processing. The process begins at step 150 where an instruction is fetched. The process then process to step 152 where the instruction is decoded to produce a decoded instruction. The process then proceeds to step 154 where the decoded instruction is interpreted to identify an operation to be performed. The process then proceeds to step 156 where control signals are generated to configure functional modules (e.g., the ones shown in FIGS. 2 through 5), to perform the corresponding operation.

The preceding discussion has presented a method and apparatus for configurable processing. By incorporating configurable ALUs within a processing unit, the integrated circuit real estate needed for such a processing unit is reduced. Therefore, the processing unit, or multiple processing units may be incorporated into a commercially viable integrated computing system.

What is claimed is:

1. A processing unit comprising:
  a fetch module operably coupled to fetch an instruction;
  a decoder operably coupled to receive the instruction and to produce, therefrom, a decoded instruction; and
  a dynamic arithmetic unit operably coupled to receive the decoded instruction such that the dynamic arithmetic unit includes at least one configurable arithmetic logic unit (ALU) having a plurality of modules and a plurality of registers, wherein at least one of the plurality of modules and at least one of the plurality of registers are coupled together in response to the decoded instruction to perform an operation identified by the decoded instruction wherein the at least one configurable ALU further comprises:
    a formatting module operable to format incoming data;
    a right shift register;
    a left shift register;
    a rounding module operable to providing a rounding signal when a result is to be rounded;
    an addition module;
    a subtraction module;
    leading zero count module;
    intermediate data registers;
    multiplier tree; and
    configuration circuitry operable to couple at least some of the formatting module, the right shift register, the left shift register, the rounding module, the addition module, the subtraction module, the leading zero count module, the intermediate registers, and the multiplier tree together to perform the operation.

2. A processing unit comprising:
  a fetch module operably coupled to fetch an instruction;
  a decoder operably coupled to receive the instruction and to produce, therefrom, a decoded instruction; and
  a dynamic arithmetic unit operably coupled to receive the decoded instruction such that the dynamic arithmetic unit includes at least one configurable arithmetic logic unit (ALU) having a plurality of modules and a plurality of registers, wherein at least one of the plurality of modules and at least one of the plurality of registers are coupled together in response to the decoded instruction to perform an operation identified by the decoded instruction wherein the at least one configurable ALU further comprises:
    a first configurable ALU that is configurable to perform, based on the decoded instruction, at least one of: an address calculation, an integer addition, an integer subtraction, an integer logic function, a packed integer addition, a packed integer subtraction, and a packed integer logic function;
    a second configurable ALU that is configurable to perform, based on the decoded instruction, at least one of: a floating point addition, a floating point subtraction, a second integer addition, a second integer subtraction, a second integer logic function, a second packed integer addition, a second packed integer subtraction, a second packed integer logic function, an integer division, an integer shift, and a packed integer shift; and
    a third configurable ALU that is configurable to perform, based on the decoded instruction, at least one of: a floating point multiplication, an integer multiply, a packed integer multiply, a third integer addition, a third integer subtraction, a third integer logic function, a third packed integer addition, a third packed integer subtraction, and a third packed integer logic function.

3. The processing unit of claim 2, wherein the first configurable ALU further comprises:
  register operably coupled to temporarily store at least one of: incoming data and intermediate data;
  a format module operably coupled to format the incoming data based on the decoded instruction to produce formatted data;
  an address calculation module operably coupled to receive the formatted data and to produce, therefrom, an address when the decoded instruction identifies an addressing operation; and
  an arithmetic/logic module operably coupled to receive the formatted data and to produce, therefrom, a result when the decoded instruction identifies an arithmetic/logic function.

4. The processing unit of claim 2, wherein the second configurable ALU further comprises:
  a formatting module operably coupled to format incoming data to produce formatted data;
  an alignment shifter operably coupled to shift the formatted data to produce aligned data when the decoded instruction indicates a floating point addition or a floating point subtraction where an exponent difference between incoming sources is greater than one;
  a subtraction module operably coupled to subtract a first value of the formatted data from a second value of the formatted data to produce a subtraction result when the decoded instruction indicates a floating point subtraction when an exponent difference between the incoming sources is equal to or less than one;
  a multiplexor operably coupled to pass aligned data when the decoded instruction indicates the floating point addition or the floating point subtraction having the exponent difference between the incoming sources greater than one and to pass the subtraction result when the decoded instruction indicates the floating point subtraction having the exponent difference between the incoming sources equal to or less than one;
  a rounding module operably coupled to receive the aligned data from the multiplexor and to generate a rounding signal when a floating point addition result is to be rounded;
  a zero count module operably coupled to receive the subtraction result from the multiplexor and to determine a zero count value therefrom;
  an addition module operably coupled to add a first value of the aligned data with a second value of the aligned data to produce an addition result and a rounded addition result, the addition module is further operably coupled to add first and second values of the incoming data when the decoded instruction indicates an integer addition;
  a rounding selection module operably coupled to select either the addition result or the rounded addition result as the floating point addition result based on the rounding signal;
  a normalizing shift module operably coupled to normalize the subtraction result based on the zero count value to produce a normalized subtraction result; and
  a second multiplexor to output either the floating point addition result or the normalized subtraction result based on the decoded instruction.

5. The processing unit of claim 2, wherein the third configurable ALU further comprises:
a formatting module operably coupled to format incoming data to produce formatted data;
a multiplier tree operably coupled to produce first and second values from the formatted data;
a rounding module operably coupled to receive the first and second values and to generate a rounding signal when a floating point multiplication result is to be rounded;
an addition module operably coupled to add the first and second values to produce a multiplication result and a rounded multiplication result, the addition module is further operably coupled to add first and second values of the incoming data when the decoded instruction indicates an integer addition; and
a rounding selection module operably coupled to select either the multiplication result or the rounded multiplication result as the floating point multiplication result based on the rounding signal.

6. A processing unit comprises:
a fetch module operably coupled to fetch an instruction;
a decoder operably coupled to receive the instruction and to produce, therefrom, a decoded instruction;
a dynamic arithmetic unit operably coupled to receive the decoded instruction, wherein the dynamic arithmetic unit includes a first configurable arithmetic unit, a second configurable arithmetic unit, and a third configurable arithmetic unit, and wherein at least one of the first, second, and third configuration arithmetic units are configured, based on the decoded instruction, to perform an operation identified by the decoded instruction wherein the second configurable arithmetic unit further comprises:
 a formatting module operably coupled to format incoming data to produce formatted data;
 an alignment shifter operably coupled to shift the formatted data to produce aligned data when the decoded instruction indicates a floating point addition or a floating point subtraction where an exponent difference between incoming sources is greater than one;
 a subtraction module operably coupled to subtract a first value of the formatted data from a second value of the formatted data to produce a subtraction result when the decoded instruction indicates a floating point subtraction when an exponent difference between the incoming sources is equal to or less than one;
 a multiplexor operably coupled to pass aligned data when the decoded instruction indicates the floating point addition or the floating point subtraction having the exponent difference between the incoming sources greater than one and to pass the subtraction result when the decoded instruction indicates the floating point subtraction having the exponent difference between the incoming sources equal to or less than one;
 a rounding module operably coupled to receive the aligned data from the multiplexor and to generate a rounding signal when a floating point addition result is to be rounded;
 a zero count module operably coupled to receive the subtraction result from the multiplexor and to determine a zero count value therefrom;
 an addition module operably coupled to add a first value of the aligned data with a second value of the aligned data to produce an addition result and a rounded addition result, the addition module is further operably coupled to add first and second values of the incoming data when the decoded instruction indicates an integer addition;
 a rounding selection module operably coupled to select either the addition result or the rounded addition result as the floating point addition result based on the rounding signal;
 a normalizing shift module operably coupled to normalize the subtraction result based on the zero count value to produce a normalized subtraction result; and
 a second multiplexor to output either the floating point addition result or the normalized subtraction result based on the decoded instruction.

7. A processing unit comprises:
a fetch module operably coupled to fetch an instruction;
a decoder operably coupled to receive the instruction and to produce, therefrom, a decoded instruction;
a dynamic arithmetic unit operably coupled to receive the decoded instruction, wherein the dynamic arithmetic unit includes a first configurable arithmetic unit, a second configurable arithmetic unit, and a third configurable arithmetic unit, and wherein at least one of the first, second, and third configuration arithmetic units are configured, based on the decoded instruction, to perform an operation identified by the decoded instruction wherein the third configurable arithmetic unit further comprises:
 a formatting module operably coupled to format incoming data to produce formatted data;
 a multiplier tree operably coupled to produce a first and second values from the formatted data;
 a rounding module operably coupled to receive the first and second values and to generate a rounding signal when a floating point multiplication result is to be rounded;
 an addition module operably coupled to add the first and second values to produce a multiplication result and a rounded multiplication result, the addition module is further operably coupled to add first and second values of the incoming data when the decoded instruction indicates an integer addition; and
 a rounding selection module operably coupled to select either the multiplication result or the rounded multiplication result as the floating point multiplication result based on the rounding signal.

* * * * *